US011922848B2

(12) United States Patent
Shi et al.

(10) Patent No.: US 11,922,848 B2
(45) Date of Patent: Mar. 5, 2024

(54) METHOD AND APPARATUS FOR COMPENSATING DISPLAYED PICTURE, DEVICE THEREOF, AND DRIVER BOARD FOR DISPLAY SCREEN

(71) Applicants: Beijing BOE Optoelectronics Technology Co., Ltd., Beijing (CN); BOE Technology Group Co., Ltd., Beijing (CN)

(72) Inventors: Tiankuo Shi, Beijing (CN); Yifan Hou, Beijing (CN); Xiangjun Peng, Beijing (CN); Chenxi Zhao, Beijing (CN); Xiaomang Zhang, Beijing (CN); Minglei Chu, Beijing (CN); Xin Duan, Beijing (CN); Wei Sun, Beijing (CN); Ming Chen, Beijing (CN); Lingyun Shi, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 52 days.

(21) Appl. No.: 17/790,749

(22) PCT Filed: Aug. 5, 2021

(86) PCT No.: PCT/CN2021/110843

§ 371 (c)(1),
(2) Date: Jul. 4, 2022

(87) PCT Pub. No.: WO2022/062709

PCT Pub. Date: Mar. 31, 2022

(65) Prior Publication Data

US 2023/0049237 A1 Feb. 16, 2023

(30) Foreign Application Priority Data

Sep. 28, 2020 (CN) ........................ 202011045475.4

(51) Int. Cl.
*G09G 3/20* (2006.01)

(52) U.S. Cl.
CPC ... *G09G 3/2003* (2013.01); *G09G 2320/0242* (2013.01)

(58) Field of Classification Search
CPC ..... G09G 2300/026; G09G 2320/0233; G09G 2320/0242; G09G 2320/0686;
(Continued)

(56) References Cited

U.S. PATENT DOCUMENTS

2009/0002360 A1 1/2009 Chen et al.
2014/0043318 A1 2/2014 Choo et al.
(Continued)

FOREIGN PATENT DOCUMENTS

CN 101312015 A 11/2008
CN 103578412 A 2/2014
(Continued)

OTHER PUBLICATIONS

CN202011045475.4 first office action.

*Primary Examiner* — Kenneth Bukowski
(74) *Attorney, Agent, or Firm* — IPro, PLLC

(57) ABSTRACT

Provided is a method for compensating a displayed picture in a display screen. The display screen includes a plurality of regions, each of the plurality of regions including a plurality of pixels; the method includes: determining transformation matrices corresponding to pixels in the plurality of regions based on texture complexities of pictures to be displayed in the plurality of regions; acquiring compensated grayscales by compensating grayscales of pixel points in the pictures to be displayed in the plurality of regions based on the transformation matrices corresponding to the pixels in the plurality of regions.

20 Claims, 5 Drawing Sheets

(58) Field of Classification Search
CPC ......... G09G 2340/06; G09G 2360/145; G09G 3/2003; G09G 3/32; G09G 5/10
See application file for complete search history.

(56) References Cited

U.S. PATENT DOCUMENTS

| | | | | |
|---|---|---|---|---|
| 2015/0035870 | A1 | 2/2015 | Ooya | |
| 2020/0286447 | A1 | 9/2020 | Hei et al. | |
| 2021/0082370 | A1 | 3/2021 | Deng et al. | |
| 2021/0193060 | A1 * | 6/2021 | Zhang ...................... | G09G 3/36 |
| 2021/0407446 | A1 | 12/2021 | Wang et al. | |
| 2023/0162335 | A1 * | 5/2023 | Wu ........................ | H04N 23/60 382/274 |

FOREIGN PATENT DOCUMENTS

| | | | |
|---|---|---|---|
| CN | 108281110 | A | 7/2018 |
| CN | 108510956 | A | 9/2018 |
| CN | 109697955 | A | 4/2019 |
| CN | 109727573 | A | 5/2019 |
| CN | 110264426 | A | 9/2019 |
| WO | 2018132987 | A1 | 7/2018 |

* cited by examiner

METHOD AND APPARATUS FOR COMPENSATING DISPLAYED PICTURE, DEVICE THEREOF, AND DRIVER BOARD FOR DISPLAY SCREEN

CROSS-REFERENCE TO RELATED APPLICATION

This application is a U.S. national stage of international application No. PCT/CN2021/110843, filed on Aug. 5, 2021, which claims priority to Chinese Patent Application No. 202011045475.4 filed on Sep. 28, 2020 and entitled "METHOD, APPARATUS AND DEVICE FOR COMPENSATING DISPLAY SCREEN, AND DISPLAY SCREEN DRIVE BOARD," and the disclosures of which are herein incorporated by references in their entireties.

TECHNICAL FIELD

The present disclosure relates to the field of display technologies, and in particular, relates to a method and apparatus for compensating a displayed picture, a device thereof, and a drive board for a display screen.

BACKGROUND

In self-light-emitting display screens, due to difference between light-emitting devices in the display screen, uniformities of luminance and chroma of the display screen need to be compensated.

SUMMARY

Embodiments of the present disclosure provide a method and apparatus for compensating a displayed picture, a device thereof, and a drive board for a display screen. The technical solutions are as follows.

In one aspect, a method for compensating a displayed picture in a display screen is provided. The display screen includes a plurality of regions, each of the plurality of regions including a plurality of pixels, and the method includes:

determining transformation matrices corresponding to pixels in the plurality of regions based on texture complexities of pictures to be displayed in the plurality of regions;

acquiring compensated grayscales by compensating grayscales of pixel points in the pictures to be displayed in the plurality of regions through the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

Optionally, determining the transformation matrices corresponding to the pixels in the plurality of regions based on the texture complexities of the pictures to be displayed in the plurality of regions includes:

receiving a texture complexity indication signal indicating the texture complexities of the pictures to be displayed in the plurality of regions, and determining the transformation matrices corresponding to the pixels in the plurality of regions based on the texture complexity indication signal; or performing an edge detection on the pictures to be displayed in the plurality of regions, determining the texture complexities of the pictures to be displayed in the plurality of regions based on a result of the edge detection on the plurality of regions, and determining the transformation matrices corresponding to the pixels in the plurality of regions based on determined texture complexities of the pictures to be displayed in the plurality of regions; or determining the texture complexities of the pictures to be displayed in the plurality of regions based on grayscales of pictures to be displayed by center pixels in the plurality of regions and grayscale mean values of pictures to be displayed by pixels in the plurality of regions, and determining the transformation matrices corresponding to the pixels in the plurality of regions based on determined texture complexities of the pictures to be displayed in the plurality of regions.

Optionally, each of the plurality of pixels in the display screen corresponds to one set of transformation matrices, the one set of transformation matrices including a plurality of transformation matrices; and each of the plurality of pixels includes a plurality of light-emitting devices; and the texture complexities are organized into a plurality of classes, and the texture complexities of the plurality of classes are in one-to-one correspondence to the plurality of transformation matrices.

Optionally, at least part of the plurality of pixels in the display screen correspond to different transformation matrices.

Optionally, the method further includes:

acquiring actual luminance of the plurality of light-emitting devices in the display screen at a same grayscale;

acquiring target luminance of the plurality of light-emitting devices in one of the pixels in the display screen at different texture complexities; and determining transformation matrices of each of the pixels at different texture complexities based on the actual luminance of the plurality of light-emitting devices in the each of the pixels and the target luminance of the plurality of light-emitting devices in the one of the pixels at different texture complexities.

Optionally, the display screen includes a plurality of sub-display screens, and the method further includes:

determining positions of the plurality of pixels in sub-display screens thereof;

determining smoothing coefficients based on the positions of the plurality of pixels in the sub-display screens thereof; and smoothing the transformation matrices based on the smoothing coefficients, and compensating the grayscales of the pixel points based on smoothed transformation matrices.

Optionally, the smoothing coefficients progressively decrease in a direction from a center of the sub-display screen to an end of the sub-display screen.

Optionally, prior to compensating the grayscales of the pixel points in the pictures to be displayed in the plurality of regions through the transformation matrices, the method further includes:

mapping the pictures to be displayed in the plurality of regions from high dynamic range images to standard dynamic range images.

Optionally, mapping the pictures to be displayed in the plurality of regions from the high dynamic range images to the standard dynamic range images includes:

acquiring color look up tables corresponding to the plurality of regions, wherein the color look up tables are related to optical properties of the plurality of regions, and the color look up tables includes corresponding relationships of original grayscales and mapped grayscales; and mapping the pictures to be displayed in the plurality of regions from the high dynamic range images to the standard dynamic range images based on the color look up tables corresponding to the plurality of regions.

In one aspect, an apparatus for compensating a displayed picture in a display screen is provided. The display screen includes a plurality of regions, each of the plurality of regions including a plurality of pixels, and the apparatus includes:

a determining module, configured to determine transformation matrices corresponding to pixels in the plurality of regions based on texture complexities of pictures to be displayed in the plurality of regions;

a compensating module, configured to acquire compensated grayscales by compensating grayscales of pixel points in the pictures to be displayed in the plurality of regions through the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

In one aspect, a computer device is provided. The computer device includes a processor and a memory; wherein the memory is configured to store computer programs; and the processor, when running the computer programs stored in the memory, is caused to perform the method for compensating the displayed picture according to any one of above aspects.

In one aspect, a non-transitory computer-readable storage medium is provided. The non-transitory computer-readable storage medium stores computer instructions therein, wherein the stored computer instructions, when executed on a processor, causes the processor to perform the method for compensating the displayed picture according to any one of above aspects.

In one aspect, a drive board for a display screen is provided. The drive board for the display screen includes:

a timing controller, configured to determine, based on a source image, compensated grayscales by the method as defined in any one of claims 1 to 9, and generate a timing control signal;

a voltage conversion circuit, configured to generate a reference voltage signal and a row drive signal based on a power supply; and a grayscale voltage generation circuit connected to the voltage conversion circuit, and configured to generate grayscale voltages required by grayscales of pixels of a panel based on the reference voltage signal;

wherein the timing control signal and the row drive signal are supplied to a row drive circuit of the panel, and the compensated grayscales, the timing control signal, and the grayscale voltages required by the grayscales of the pixels of the panel are supplied to a column drive circuit of the panel.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages in the present disclosure, the embodiments of the present disclosure are described in detail hereinafter in combination with the accompanying drawings.

In self-light-emitting display screens, due to difference between light-emitting devices in the display screen, uniformities of luminance and chroma of the display screen need to be compensated. Taking a display screen including a plurality of pixels composed of light-emitting devices of red, green, and blue as an example, for color coordinates corresponding to maximum grayscales of the light-emitting devices at a same color or at different colors, some color coordinates is close to color coordinates of the white points, and some coordinates is close to edges of the coordinates. Generally, the light-emitting devices close to the edges of the coordinates display more colorful image compared to the light-emitting devices close to the white points, such that the displays at a same grayscale are different, that is, the uniformity is poor. For compensation for this case, the light-emitting devices close to the edges of the coordinates are generally compensated to close to the white points, such that distances between the color coordinates corresponding to the maximum grayscales of the light-emitting devices in the whole display screen and the white points are equal, such that the uniformity of the display screen is ensured.

In this compensation method, the uniformity may be improved. However, the light-emitting devices close to the edges of the coordinates need to be compensated as the light-emitting devices close to the white points, and the distances between the color coordinates corresponding to the maximum grayscales of the light-emitting devices in the whole display screen and the white points are equal, such that color levels of the compensated display screen are decreased, the color gamut of the display screen is lost, and the contrast of the display screen is decreased.

The embodiments of the present disclosure provide a method for compensating a displayed picture, and the method is applicable to a self-light-emitting display screen, such as, an organic light emitting diode (OLED) display screen, or a mini light emitting diode (MINI LED) display screen.

Figure 1:
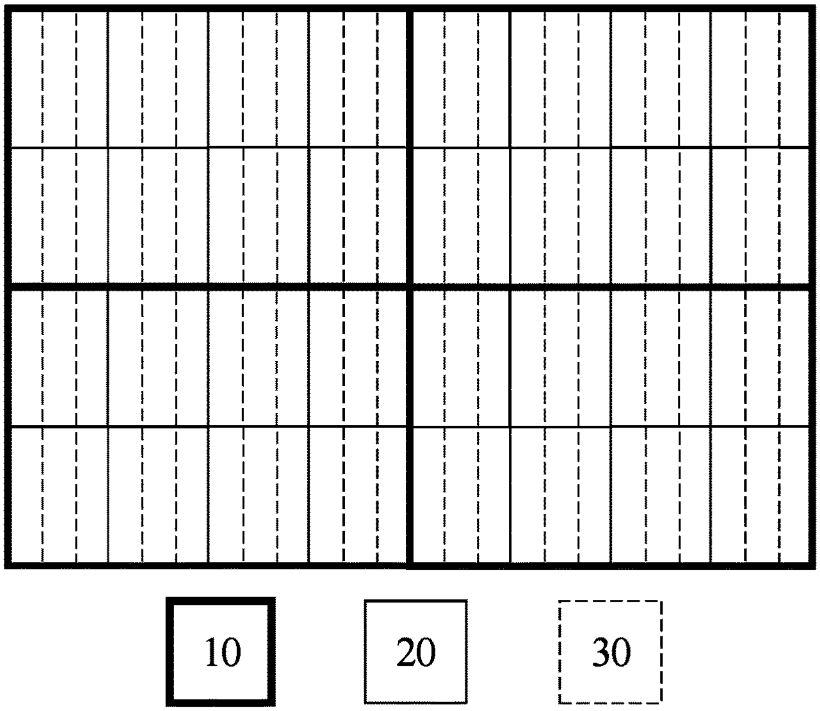
FIG. 1 is a schematic structural diagram of a self-light-emitting display screen according to an embodiment of the present disclosure.

FIG. 1 is a schematic structural diagram of a self-light-emitting display screen according to an embodiment of the present disclosure. Referring to FIG. 1, the self-light-emitting display screen includes a plurality of regions 10, each of the plurality of regions 10 includes a plurality of pixels 20, and each of the plurality of pixels includes a plurality of light-emitting devices 30. The light-emitting device 30 may be a light emitting diode, such as the OLED, MINI LED, and the like.

Illustratively, the self-light-emitting display screen may be a complete display screen, and each region 10 is a part of the display screen. Or, the self-light-emitting display screen is composed of a plurality of sub-display screens, and each of the plurality of sub-display screens may be one region 10. Or, each of the plurality of sub-display screens includes a plurality of regions 10.

The self-light-emitting display screen may be controlled by one drive board for a display screen or a plurality of drive boards for the display screen. For example, each region is controlled by one drive board for the display screen. Or, the plurality of regions are controlled by the same drive board for the display screen. Or, one region is controlled by a plurality of drive boards for the display screen.

For the self-light-emitting display screen, the luminance and chroma may be compensated for differences between the light-emitting devices. By the compensation method in the related art, the overall capability of most of the light-emitting devices may be limited due to some light-emitting devices, such that the overall display screen may lose 30% gamut area which is difficult to compensated, and the color is lost.

Figure 2:
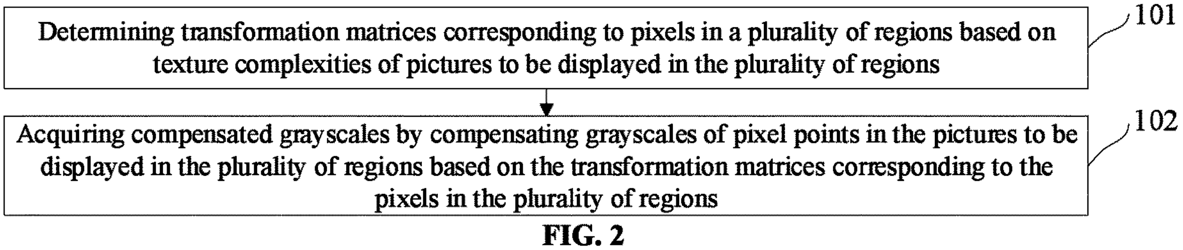
FIG. 2 is a flowchart of a method for compensating a displayed picture according to an embodiment of the present disclosure.

FIG. 2 is a flowchart of a method for compensating a displayed picture according to an embodiment of the present disclosure. Referring to FIG. 2, the method includes the following processes.

In S101, transformation matrices corresponding to pixels in a plurality of regions are determined based on texture complexities of pictures to be displayed in the plurality of regions.

The texture is represented by a distribution of grayscales of the pixels and spatial neighborhood. The less the difference between the grayscales of the pixels in the displayed picture and spatial neighborhood, the lower the texture complexity. The greater the difference between the grayscales of the pixels in the displayed picture and spatial neighborhood, the higher the texture complexity.

The transformation matrix is configured to compensate the grayscale of the pixel point, and compensated pixel point may be acquired by multiplying the transformation matrix and the grayscales of channel values of various colors pf the pixel point.

For example, the pixel point includes three channels red (R), green (G), and blue (B) at grayscales of R, G, and B, which may be represented by a matrix:

$$\begin{bmatrix} R_{in} \\ G_{in} \\ B_{in} \end{bmatrix},$$

and the transformation matrix may be a 3*3 matrix:

$$\begin{bmatrix} c_{11} & c_{12} & c_{13} \\ c_{21} & c_{22} & c_{23} \\ c_{31} & c_{32} & c_{33} \end{bmatrix}.$$

The two matrices may be multiplied to acquire a matrix composed of the grayscales of three channels corresponding to the compensated pixel points:

$$\begin{bmatrix} R_{out} \\ G_{out} \\ B_{out} \end{bmatrix}.$$

In S102, compensated grayscales are acquired by compensating grayscales of pixel points in the pictures to be displayed in the plurality of regions based on the transformation matrices corresponding to the pixels in the plurality of regions.

The compensated grayscales are configured to control display of the pictures of the plurality of regions, such that an uniformity of a picture displayed in a first region is greater than an uniformity of a picture displayed in a second region. A texture complexity of the first region is less than a texture complexity of the second region, and each of the first region and the second region is one of the plurality of regions.

The uniformity of the displayed picture indicates an uniformity of luminance generated by different light-emitting devices at the same grayscale.

In the method for compensating the displayed picture in the embodiments of the present disclosure, the pictures at different texture complexities are compensated based on different transformation matrices. In the case that the complexity is lower, the picture is relatively flat. In this case, the transformation matrix is used to increase the uniformity of the compensated picture, such that the uniformity of the flat picture is best. In the case that the complexity is higher, the transformation matrix is used to increase the uniformity of the picture on the premise that the compensated picture includes a color gamut range. In this case, the uniformity of the picture is not best, but the color gamut of the picture and contrast are ensured. The above solutions achieve compensation of the uniformity and ensure the contrast of the panel.

Figure 3:
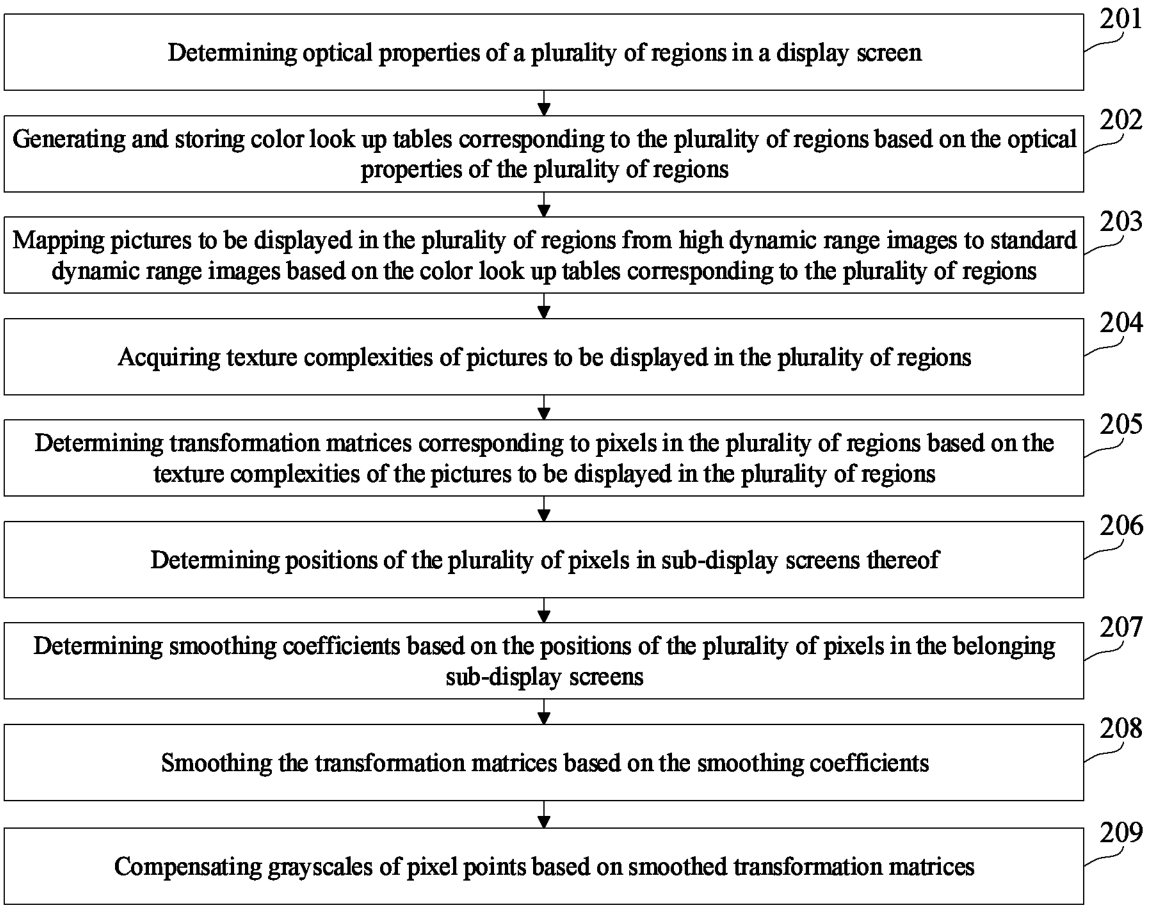
FIG. 3 is a flowchart of a method for compensating a displayed picture according to an embodiment of the present disclosure.

FIG. 3 is a flowchart of a method for compensating a displayed picture according to an embodiment of the present disclosure. Referring to FIG. 3, the method includes the following processes.

In S201, optical properties of a plurality of regions in a display screen are determined.

The optical properties of the plurality of regions in the display screen include, but are not limited in, the maximum luminance of the display screen, the minimum luminance of the display screen, and the color gamut range. The above optical properties are measured by optical devices, and the acquired date are stored.

In S202, color look up tables (LUT) corresponding to the plurality of regions are generated based on the optical properties of the plurality of regions, and stored.

The color look up table is related to the optical properties of the region, and the color look up table includes the corresponding relationship of an original grayscale and a mapped grayscale.

In the color look up table, the original grayscale may be mapped into the mapped grayscale according to the follows.

out=pow(in, n). "in" represents the original grayscale, "out" represents the mapped grayscale, n is a mapping coefficient of a positive number, and "pow" represents n power operation on "in."

In generating the color look up tables corresponding to the plurality of regions, different mapping coefficients may be assigned based on the optical properties of the plurality of regions, the mapped grayscales corresponding to the grayscales are calculated, and then the color look up tables are generated.

In assigning mapping coefficients, the greater the color gamut range of the region, the less the mapping coefficient of the region. The less the color gamut range of the region, the greater the mapping coefficient of the region.

For example, in the case that the original grayscale is (0, 253, 0), for the color consistency, a mapped value in a region with a greater color gamut range is (0, 252, 0), and a mapped value in a region with a less color gamut range is (2, 254, 0). It can be seen that, the region with a less color gamut range adopts a greater mapping coefficient. The color gamut range is merely a parameter for determining the mapping coefficient, and the optical properties of the region may be adopted for determining the mapping coefficient.

The mapping operation is performed based on the color look up table, such that the operation process may be simplified, and the processing speed is quickened.

In S203, pictures to be displayed in the plurality of regions are mapped from high dynamic range (HDR) images to standard dynamic range (SDR) images based on the color look up tables corresponding to the plurality of regions.

Illustratively, the color look up tables corresponding to the plurality of regions are acquired, and the pictures to be displayed in the plurality of regions are mapped from the high dynamic range images to the standard dynamic range images based on the color look up tables corresponding to the plurality of regions.

Mapped pictures of the pictures to be displayed in the regions corresponding to the color look up tables are acquired by looking up, from the color look up tables, mapped grayscales corresponding to pixels in the pictures to be displayed in the regions corresponding to the color look up tables.

Local color mapping may be performed in images in different regions based on the color look up tables of the plurality of regions in the display screen. The picture, prior to mapping, is HDR, and corresponds to 1024 scales of luminance information from 0 to 10000 nit. However, the luminance of the display screen is at most from hundreds to one thousand. Therefore, the picture, prior to mapping, cannot be directly displayed on the display screen, and the picture needs to be mapped into a screen with appropriate luminance and color gamut, such that content of source image may be displayed.

In S204, texture complexities of pictures to be displayed in the plurality of regions are acquired.

Illustratively, the texture complexities may be acquired by the following method.

In a first method, a texture complexity indication signal is acquired, and the texture complexity indication signal is configured to indicate the texture complexities of the pictures to be displayed in the plurality of regions.

Illustratively, the method may be performed by a rear board of the display screen. A front board may determine the texture complexities based on the images, and send the texture complexity indication signal to the rear board.

The texture complexity indication signal sent by the front board may be configured to indicate the texture complexities, and the texture complexities may be organized into a plurality of classes from complex texture to simple texture based on the actual requirement.

The front board may be a sending board, and the rear board may be a receiving board. Or, the front board may be a receiving board, and the rear board may be a bridge chip.

In a second method, an edge detection is performed on the pictures to be displayed in the plurality of regions, and the texture complexities of the pictures to be displayed in the plurality of regions are determined based on a result of the edge detection on the plurality of regions.

Illustratively, whether the pixel points in a picture to be displayed in a region is at edge is determined by the edge detection. In the case that a number of pixel points, which are at edge, in a picture to be displayed in a region is greater, the texture complexity of the picture to be displayed in the region is higher. A plurality of threshold values of edge pixel points may be set, and the corresponding texture complexity is determined based on a relationship between the number of pixel points at edge and the plurality of threshold values.

There are various methods for performing the edge detection on the picture. For example, calculating gradients of the pixel points in the picture; comparing the gradients of the pixel points with a threshold; determining a pixel being an edge pixel in the case that the gradient is greater than the threshold; determining a pixel being not an edge pixel in the case that the gradient is not greater than the threshold.

The gradients of the pixel points are calculated based on a Sobel operator, and the Sobel operator is weighting grayscale values of surrounding pixel points of the pixel points in the image.

For example, lateral weighted value and longitudinal weighted value are calculated based on $$\begin{bmatrix} -1 & -2 & -1 \\ 0 & 0 & 0 \\ -1 & -2 & -1 \end{bmatrix} \text{ and } \begin{bmatrix} -1 & 0 & -1 \\ -2 & 0 & -2 \\ -1 & 0 & -1 \end{bmatrix}$$

respectively, and then grayscale weighted value G is calculated based on $G=\sqrt{G_x^2+G_y^2}$. G represents the gradient of the pixel point, Gx represents the lateral weighted value, and Gy represents the longitudinal weighted value.

In a third method, the texture complexities of the pictures to be displayed in the plurality of regions are determined based on grayscales of pictures to be displayed by center pixels in the plurality of regions and grayscale mean values of pictures to be displayed by pixels in the plurality of regions.

Illustratively, the texture complexities may be determined based on difference values between the grayscales of the pictures to be displayed by the center pixels and the grayscale mean values. The less the difference values, the less the texture complexities. The greater the difference values, the greater the texture complexities. For example, in the case that the grayscale of the picture to be displayed by the center pixel is 255, and the grayscale mean value of the region is 10, the difference value is greater, such that the luminance variation in the region is apparent, and the texture complexity is greater.

Figure 4:
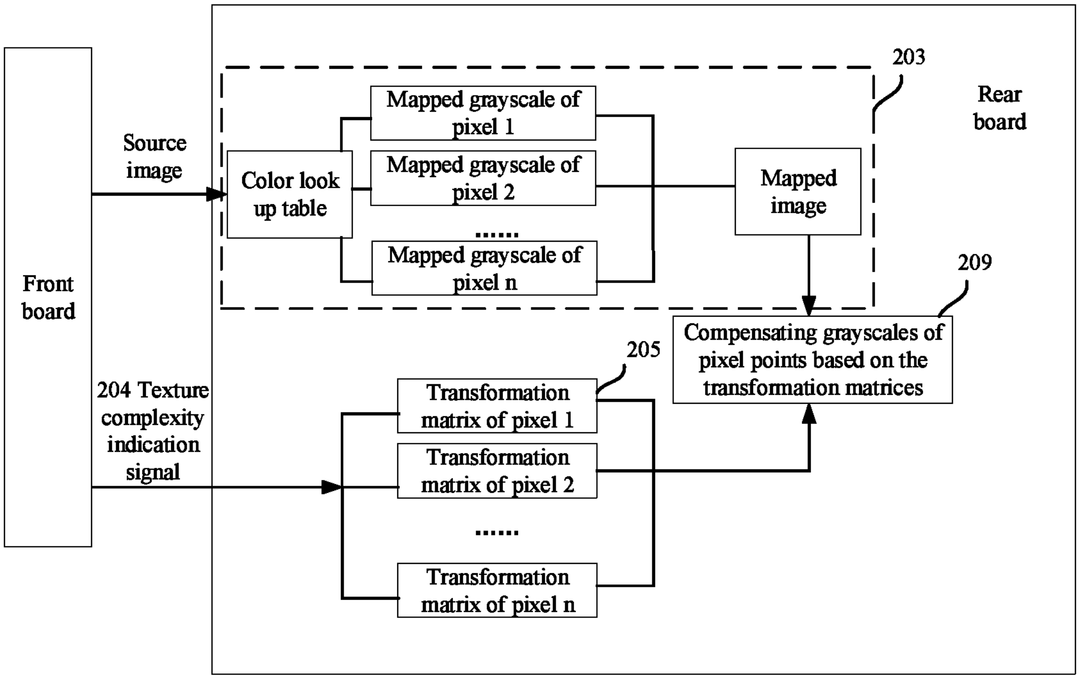
FIG. 4 is a flowchart of a method for compensating a displayed picture according to an embodiment of the present disclosure.

In the implementation, two types of methods for determining the texture complexities are provided. The first method is classified as a first type, in which the front board determines the texture complexities, and sends the texture complexities to the rear board through the texture complexity indication signal. In the first type, an interface need to be added between the front board and the rear board to transmit the source image. In the first type, two interfaces are needed, one interface is configured to transmit the source image, and the other interface is configured to transmit the texture complexity indication signal. As shown in FIG. 4, the front board transmits the source image and the texture complexity indication signal to the rear board through the two interfaces respectively. An image mapping is performed on the source image in S203, the transformation matrices are selected based on the texture complexity indication signal in S205, and the grayscales of the pixels in the pictures in the mapped image are compensated based on the transformation matrices in S209.

Figure 5:
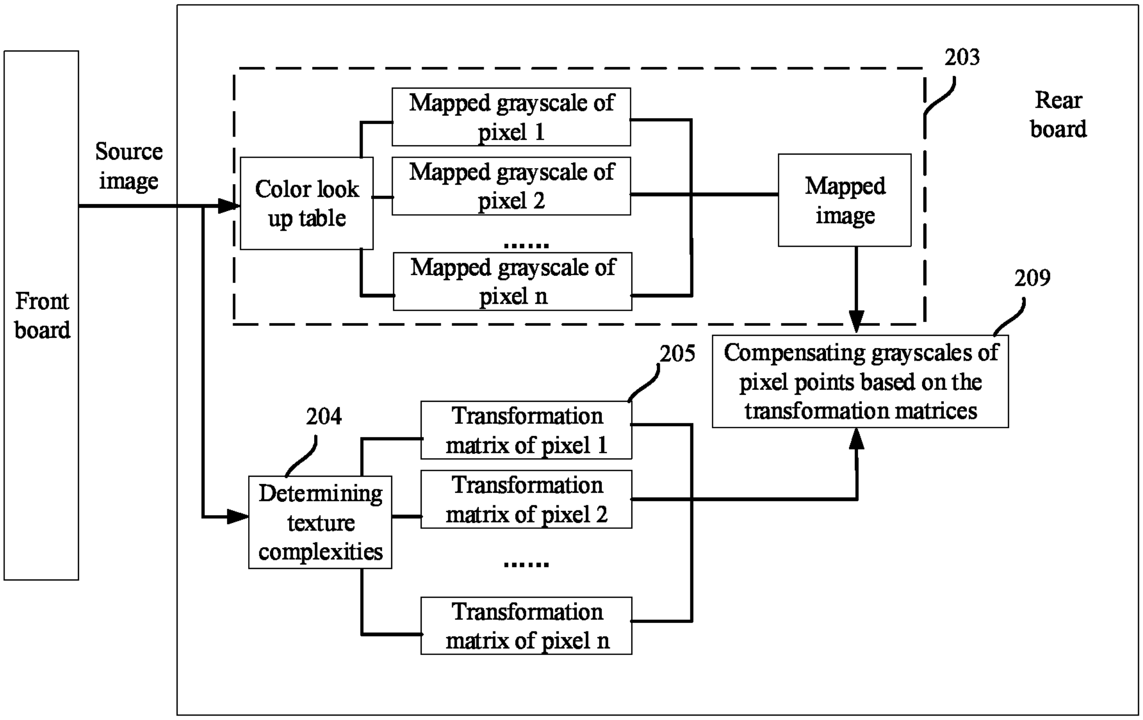
FIG. 5 is a flowchart of a method for compensating a displayed picture according to an embodiment of the present disclosure.

The second method and the third method are classified as a second type, in which the texture complexities are calculated based on Intellectual Property (IP) algorithm in the rear board. As shown in FIG. 5, the front board transmits the source image to the rear board through an interface, and an image mapping is performed on the source image in S203. In this case, the texture complexities are determined based on the source image in S204, the transformation matrices are selected based on the texture complexity indication signal in S205, and the grayscales of the pixels in the pictures in the mapped image are compensated based on the transformation matrices in S209.

Figure 6:
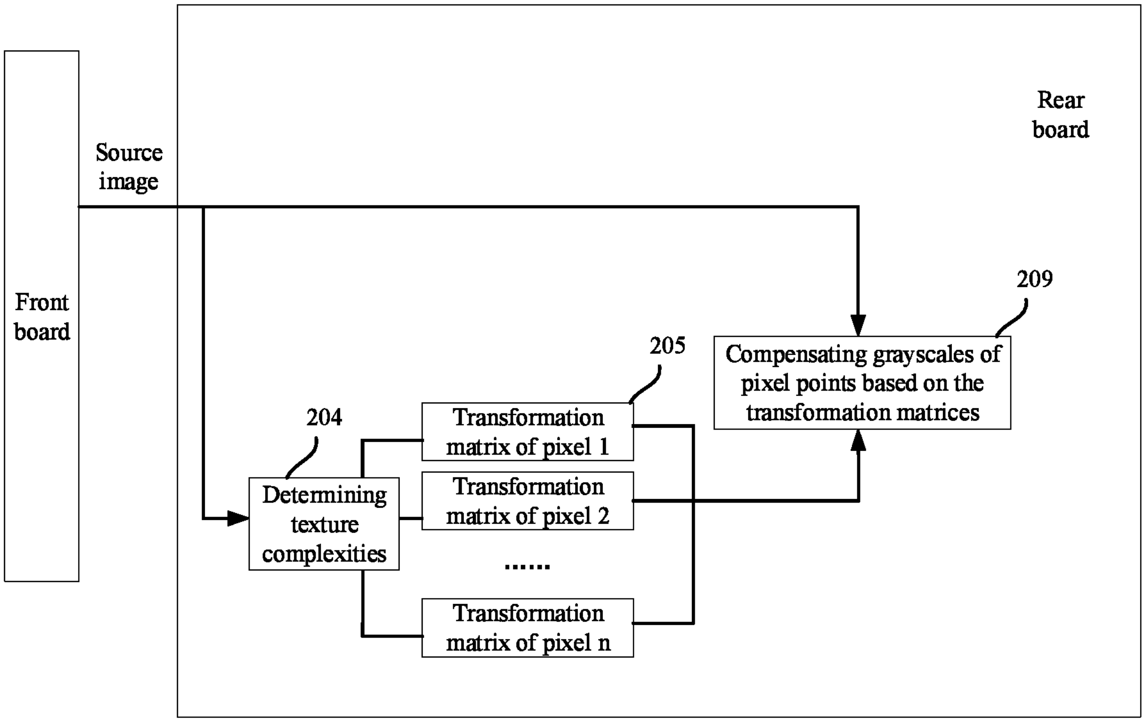
FIG. 6 is a flowchart of a method for compensating a displayed picture according to an embodiment of the present disclosure.

S201 to S203 are optional processes, and S204 may be performed directly without mapping. As shown in FIG. 6, the grayscales of the pixels in the pictures in the source image are compensated based on the transformation matrices in S209.

A performing body in S201 to S203 and a performing body in subsequent processes may be the same module in the rear board, or may be two modules in the rear board. The rear board, after performing the processes in FIG. 2, outputs the compensated grayscales to the panel of the display screen. It is noted that, bits of data of the source image inputted into the rear board and bits of the compensated grayscales output by the rear board to the panel may be different. For example, the bits of data of the source image is 9 bits, and the bits of the output compensated grayscales is 15 bits.

In S205, the transformation matrices corresponding to the pixels in the plurality of regions are determined based on the texture complexities of the pictures to be displayed in the plurality of regions.

Illustratively, each of the plurality of pixels in the display screen corresponds to one set of transformation matrices, and the one set of transformation matrices includes a plurality of transformation matrices. Each of the plurality of pixels includes a plurality of light-emitting devices. The texture complexities are organized into a plurality of classes, and the texture complexities of the plurality of classes are in one-to-one correspondence to the plurality of transformation matrices.

In the embodiments of the present disclosure, at least part of the plurality of pixels in the display screen correspond to different transformation matrices. As the difference between the light-emitting devices in different pixels, the same compensation effect corresponds to different transformation matrices.

For example, the display screen includes n pixels, and n sets of transformation matrices may be pre-stored a register in the rear board. The transformation matrices stored the register of the n pixels constitute a transformation matrix map, and the corresponding transformation matrix may be determined for each pixel from the transformation matrix map based on the texture complexities.

The corresponding relationship between each pixel in the display screen and the transformation matrix may be determined based on the following method.

In step 1, actual luminance of the plurality of light-emitting devices in the display screen at the same grayscale is acquired. For example, the luminance of the plurality of light-emitting devices in the display screen is photographed by a camera.

In step 2, target luminance of the plurality of light-emitting devices in one pixel in the display screen at different texture complexities is acquired. The target luminance is set for the plurality of light-emitting devices in each pixel in the display screen as required.

In the case that the texture complexity is lower, the target luminance of the plurality of light-emitting devices in one pixel is lower, such that the plurality of light-emitting devices may achieve the luminance, and the uniformity may be ensured. With the texture complexity increasing, the target luminance of the plurality of light-emitting devices in one pixel is greater, thereby ensuring the color gamut range displayed in the region.

In step 3, transformation matrices of each pixel at different texture complexities are determined based on the actual luminance of the plurality of light-emitting devices in each pixel and the target luminance of the plurality of light-emitting devices in one pixel at different texture complexities.

Illustratively, the actual luminance of each pixel at the maximum grayscale is pre-acquired by photographing, and different pixels correspond to a set of target luminance. A set of target luminance is target luminance at different texture complexities, and a set of target luminance corresponding to different pixels are same. Values of the transformation matrices may be calculated based on the actual luminance and the target luminance, such that the display screen may achieve a great display effect in using the transformation matrix corresponding to the texture complexity.

A set of transformation matrices corresponding to each pixel is acquired based on above method. The transformation matrix may be a 3*3 matrix:

$$\begin{bmatrix} c_{11} & c_{12} & c_{13} \\ c_{21} & c_{22} & c_{23} \\ c_{31} & c_{32} & c_{33} \end{bmatrix},$$

and weighted values C11 to C33 in the 3*3 matrix are calculated based on above steps.

In S206, positions of the plurality of pixels in sub-display screens thereof are determined.

Illustratively, the sub-display screen may be divided into a plurality of sub-regions from a center of the sub-display screen to an end of the sub-display screen, and a position of the pixel in the sub-display screen may be the sub-region to which the pixel belongs.

Determining positions of the plurality of pixels in sub-display screens thereof includes:

acquiring coordinates of the pixels in edges of the sub-regions in the sub-display screens;

acquiring positions of the plurality of pixels in sub-display screens thereof by determining the sub-regions thereof of the coordinates of the pixels.

Figure 7:
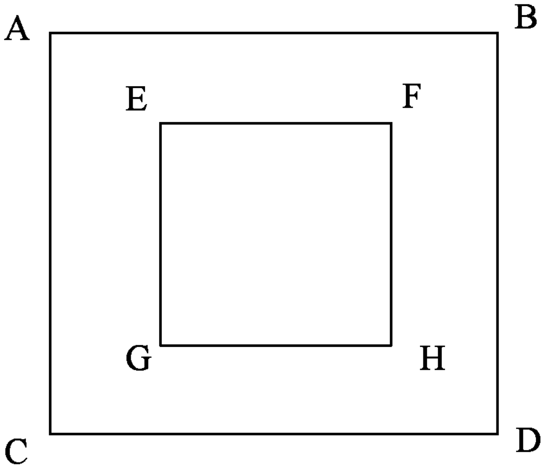
FIG. 7 is a schematic diagram of a partition of a display screen according to an embodiment of the present disclosure.

As shown in FIG. 7, for example, coordinates of four vertexes of a first sub-display screen are A(0, 0), B(100, 0), C(0, −100), and D(100, −100). Assuming that the sub-display screen is divided into a center sub-region and an edge sub-region, coordinates of four vertexes of the center sub-region are E(25, −25), F(75, −25), G(25, −75), and H(75, −75), and coordinates of eight vertexes of the edge sub-region are the coordinates of four vertexes of the sub-display screen and four vertexes of the center sub-region.

Assuming that coordinates of the pixel are (30, −30), the position of the pixel in the sub-display screen is within the center sub-region. Assuming that coordinates of the pixel are (20, −30), the position of the pixel in the sub-display screen is within the edge sub-region.

In S207, smoothing coefficients are determined based on the positions of the plurality of pixels in the sub-display screens thereof.

Illustratively, the smoothing coefficients progressively decrease in a direction from a center of the sub-display screen to an end of the sub-display screen.

For example, the smoothing coefficient of the center sub-region is 0.5, the smoothing coefficient of the most edge sub-region is 0.1, and the smoothing coefficients of the sub-regions are assigned in accordance with the gradual decrease from 0.5 to 0.1. The less the smoothing coefficient, the closer the smoothed transformation matrices corresponding to edges of adjacent regions. Therefore, the edges of adjacent regions are compensated based on similar transformation matrices, such that the display styles of the pixels in the edges of adjacent regions are coincided, and apparent changes may not occur.

In S208, the transformation matrices are smoothed based on the smoothing coefficients.

A smoothing operation is multiplying the smoothing coefficient and the transformation matrix.

For a tiled screen, as differences are present between the sub-display screens, edges of the sub-display screens in the tiled screen are smoothed based on less smoothing coefficients, such that the edges of the sub-display screens are in a state, and the apparent change due to greater difference between the edges of the adjacent sub-display screens compensated by the transformation matrices is avoided. In the center of the sub-display screen, greater smoothing coefficients are used to ensure the differential compensation for the center of the sub-display screen.

S206 to S208 are optional processes, and the transformation matrix may be not smoothed. That is, the transition between the sub-display screens is ignored, and the determined transformation matrix in S205 is directly used to compensate the grayscales, as shown in FIGS. 4 to 6. In the case that S206 to S208 are performed, S206 to S208 may be set between S205 to S209.

In S209, the grayscales of the pixel points are compensated based on smoothed transformation matrices.

For a region at the complex texture (that is, expectation of a larger color gamut) and not critical requirement in uniformity (such as, a leaf, and a desert), the solutions may improve color gamut, and make colors more vivid, such that the visual effect of the region is improved.

For a region at simple texture (that is, the region with the expectation of a greater uniformity, such as, sky, lake water, and the like), the requirement in uniformity is greater, and the non-uniformity display may lose quality of the image, and the solutions may ensure uniformity display.

The compensated grayscales are acquired by compensating the grayscales of the pixels based on the transformation matrices, and the compensated grayscales may be used to control the grayscales of the light-emitting devices in the display screen.

In the compensation solution for the self-light-emitting display screen provided in embodiments of the present disclosure, the colors may be more vivid, and the color gamut range is increased. The textures of the screens of the regions are analyzed. For complex region, the appropriate transformation matrices are used, such that the display effect with slightly less uniformity and greater color gamut is achieved, and the limitation of capability of displaying colors due to decreased compensation for uniformity is overcame. In this way, colors of the regions at complex textures are enhanced, the loss of the uniformity is less, and the uniformity of the regions with greater uniformity and simple textures is ensured. Therefore, the effect required by human eyes is achieved.

Figure 8:
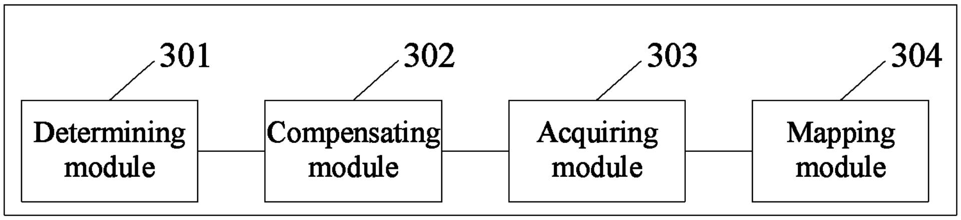
FIG. 8 is a block diagram of an apparatus for compensating a displayed picture according to an embodiment of the present disclosure.

FIG. 8 is a block diagram of an apparatus for compensating a displayed picture according to an embodiment of the present disclosure. The display screen includes a plurality of regions, and each of the plurality of regions includes a plurality of pixels. Referring to FIG. 8, the apparatus includes a determining module 301 and a compensating module 302.

The determining module 301 is configured to determine transformation matrices corresponding to pixels in the plurality of regions based on texture complexities of pictures to be displayed in the plurality of regions. The compensating module 301 is configured to compensated grayscales by compensating grayscales of pixel points in the pictures to be displayed in the plurality of regions through the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

Optionally, the determining module 301 is configured to receive a texture complexity indication signal indicating the texture complexities of the pictures to be displayed in the plurality of regions, and determine the transformation matrices corresponding to the pixels in the plurality of regions based on the texture complexity indication signal; or perform an edge detection on the pictures to be displayed in the plurality of regions, determine the texture complexities of the pictures to be displayed in the plurality of regions based on a result of the edge detection on the plurality of regions, and determine the transformation matrices corresponding to the pixels in the plurality of regions based on determined texture complexities of the pictures to be displayed in the plurality of regions; or determine the texture complexities of the pictures to be displayed in the plurality of regions based on grayscales of pictures to be displayed by center pixels in the plurality of regions and grayscale mean values of pictures to be displayed by pixels in the plurality of regions, and determine the transformation matrices corresponding to the pixels in the plurality of regions based on determined texture complexities of the pictures to be displayed in the plurality of regions.

Optionally, each of the plurality of pixels in the display screen corresponds to one set of transformation matrices, the one set of transformation matrices including a plurality of transformation matrices; and each of the plurality of pixels includes a plurality of light-emitting devices; and the texture complexities are organized into a plurality of classes, and the texture complexities of the plurality of classes are in one-to-one correspondence to the plurality of transformation matrices.

Optionally, at least part of the plurality of pixels in the display screen correspond to different transformation matrices.

Optionally, the apparatus may further include an acquiring module 303, configured to acquire actual luminance of the plurality of light-emitting devices in the display screen at the same grayscale; and acquire target luminance of the plurality of light-emitting devices in one pixel in the display screen at different texture complexities;

the determining module 301 is further configured to determine transformation matrices of each pixel at different texture complexities based on the actual luminance of the plurality of light-emitting devices in each pixel and the target luminance of the plurality of light-emitting devices in one pixel at different texture complexities.

Optionally, the display screen includes a plurality of sub-display screens, and the determining module 301 is further configured to determine positions of the plurality of pixels in sub-display screens thereof, and determine smoothing coefficients based on the positions of the plurality of pixels in the sub-display screens thereof; and the compensating module 302 is configured to smooth the transformation matrices based on the smoothing coefficients, and compensate the grayscales of the pixel points based on smoothed transformation matrices.

Optionally, the smoothing coefficients progressively decrease in a direction from a center of the sub-display screen to an end of the sub-display screen.

Optionally, the apparatus may further include a mapping module 304, configured to map the pictures to be displayed in the plurality of regions from high dynamic range images to standard dynamic range images prior to the grayscales of the pixel points in the pictures to be displayed in the plurality of regions are compensated based on the transformation matrices.

Optionally, the mapping module 304 is configured to acquire color look up tables corresponding to the plurality of regions, wherein the color look up tables are related to optical properties of the plurality of regions, and the color look up tables include corresponding relationships of original grayscales and mapped grayscales; and map the pictures to be displayed in the plurality of regions from the high dynamic range images to the standard dynamic range images based on the color look up tables corresponding to the plurality of regions.

It should be noted that, when the apparatus for compensating the displayed picture in the above embodiments performs a misalignment compensation of the display picture, division of the above functional modules is merely used as an example. In actual applications, the foregoing functions can be achieved by different functional modules as required. That is, the internal structure of the apparatus is divided into different functional modules to achieve all or part of the functions described above. In addition, the apparatus for compensating the displayed picture in the above embodiments and the method for compensating the displayed picture in the above embodiments belong to the same concept, and the specific implementation process is detailed in the method embodiments, which are not repeated herein.

Figure 9:
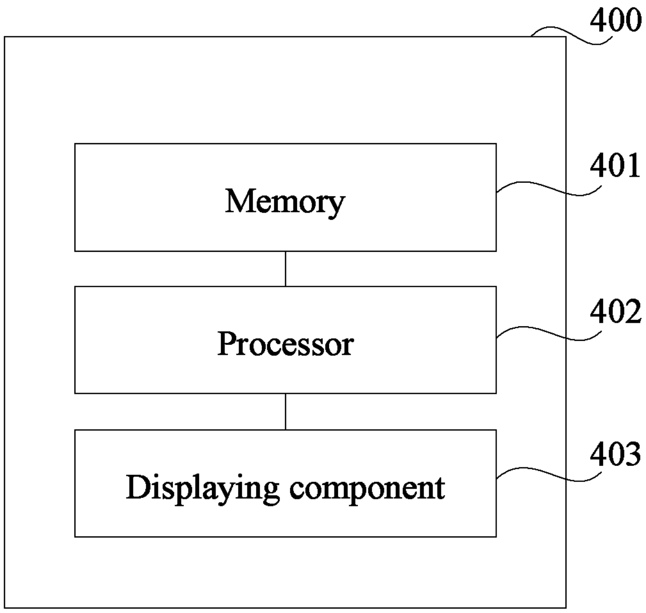
FIG. 9 is a block diagram of a computer device according to an embodiment of the present disclosure.

As shown in FIG. 9, an embodiment of the present disclosure further provides a computer device 400. The computer device 400 may be a display apparatus with a self-light-emitting display screen, or other computer devices with the self-light-emitting display screen. The computer device 400 may be configured to perform the method for compensating the displayed picture in the above embodiments. Referring to FIG. 9, the computer device 400 includes a memory 401, a processor 402, and a display component 403. It should be understood for those skilled in the art that the structure of the computer device 400 shown in FIG. 9 does not constitute a limitation to the computer device 400, and may include more or less components than those illustrated, or combine some components or adopt different component arrangements in practical applications.

The memory 401 may be configured to store a computer program and a module, and mainly include a program storage region and a data storage area. A program storage region may store an operating system, an application required by at least one function, and the like. The memory 401 may include a high-speed random-access memory, and may further include a non-volatile memory, such as at least one magnetic disk storage device, a flash memory device, or other non-volatile solid-state storage devices. Correspondingly, the memory 401 may further include a memory controller configured to provide the processor 402 with access to the memory 401.

The processor 402 performs various functional applications and data processing by running software programs and modules stored in the memory 401.

The display component 403 is configured to display images. The display component 403 may include a display screen. The pixels in the display screen may be achieved by a micro inorganic light-emitting diode, an organic electroluminescent diode (OLED), and the like.

In an exemplary embodiment, a computer-readable storage medium is further provided, which is a non-transitory computer-readable storage medium. The computer-readable storage medium stores a computer program therein. The computer program in the computer-readable storage medium, when run by a processor, causes the processor to perform the method for compensating the displayed picture according to the embodiments of the present disclosure.

In an exemplary embodiment, a computer program product is further provided. The computer program product stores instructions. The instructions, when executed by a computer, causes the computer to perform the method for compensating the displayed picture according to the embodiments of the present disclosure.

In an exemplary embodiment, a chip is further provided. The chip includes a programmable logic circuit and/or program instruction. The chip can perform the method for compensating the displayed picture according to the embodiments of the present disclosure when running.

Figure 10:
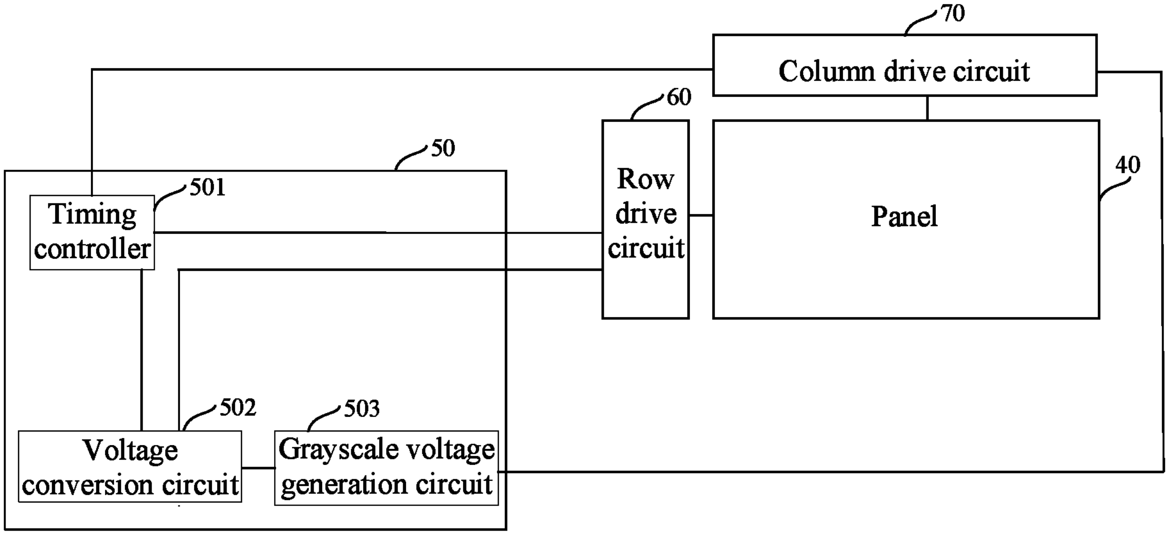
FIG. 10 is a schematic structural diagram of a drive board for a display screen according to an embodiment of the present disclosure.

FIG. 10 is a schematic structural diagram of a drive board for a display screen according to an embodiment of the present disclosure. Referring to FIG. 10, the drive board for the display screen may also be referred to as a T-CON board 50, and includes: a timing controller (T-CON) 501, a voltage conversion (DC-DC) circuit 502, and a grayscale voltage generation (Gamma) circuit 503.

The timing controller 501 is configured to determine compensated grayscales based on a source image by the method shown in any one of FIG. 2 to FIG. 6; and generate a timing control signal.

The voltage conversion circuit 502 is configured to generate a reference voltage signal (VDA) and a row drive signal based on a power supply.

The grayscale voltage generation circuit 503 is connected to the voltage conversion circuit 502, and configured to generate grayscale voltages required by grayscales of pixels of the panel 40 based on the reference voltage signal.

The timing control signal and the row drive signal are supplied to a row drive circuit 60 (also referred to as a gate drive circuit) of the panel 40, and the compensated grayscales, the timing control signal, and the grayscale voltages required by the grayscales of the pixels of the panel are supplied to a column drive circuit 70 (also referred to as a source drive circuit) of the panel 40.

Illustratively, the row drive circuit 60 is connected to the timing controller 501, the voltage conversion circuit 502, and the panel 40, and is configured to control switches of the rows of pixels of the panel 40 based on the timing control signal by the row drive signal.

The column drive circuit 70 is connected to the timing controller 501, the grayscale voltage generation circuit 503, and the panel 40, and is configured to write, based on the compensated grayscale and the timing control signal, a grayscale voltage supplied by the grayscale voltage generation circuit 503 into the columns of pixels of the panel 40.

In one possible implementation, the driving control of the regions in the display screen can be implemented simultaneously by one drive board for the display screen.

The timing control signal includes a shift start pulse signal (STV) of a row drive circuit shift register, a trigger pulse signal (CKV) of the row drive circuit shift register, a shift start pulse signal (STH) of a column drive circuit shift register, a trigger pulse signal (CKH) of a source drive circuit shift register, and a polarity inversion control signal (POL). The row drive signal includes a gate high level signal (VGH) and a gate low level signal (VGL).

As shown in FIG. 10, the voltage conversion circuit 502 is further connected to the timing controller 501, and the voltage conversion circuit 502 may further generate a power supply voltage signal (VDD) and supply the power supply voltage signal to the timing controller 501.

The power supply voltage signal may be further supplied to the aforementioned column drive circuit.

Illustratively, a power supply input by the voltage conversion circuit 502 is usually a 12V or 5V power supply.

It may be understood by a person of ordinary skill in the art that all or part of steps in the above embodiments may be performed by hardware, or by relevant hardware instructed by a program. The program may be stored in a computer-readable storage medium which includes a read-only memory, a magnetic disk, an optical disc, or the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A method for compensating a displayed picture in a display screen, the display screen comprising a plurality of regions, each of the plurality of regions comprising a plurality of pixels;

the method comprising:

determining transformation matrices corresponding to pixels in the plurality of regions based on texture complexities of pictures to be displayed in the plurality of regions;

acquiring compensated grayscales by compensating grayscales of pixel points in the pictures to be displayed in the plurality of regions based on the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

2. The method according to claim 1, wherein determining the transformation matrices corresponding to the pixels in the plurality of regions based on the texture complexities of the pictures to be displayed in the plurality of regions comprises:

receiving a texture complexity indication signal indicating the texture complexities of the pictures to be displayed in the plurality of regions, and determining the transformation matrices corresponding to the pixels in the plurality of regions based on the texture complexity indication signal; or performing an edge detection on the pictures to be displayed in the plurality of regions, determining the texture complexities of the pictures to be displayed in the plurality of regions based on a result of the edge detection on the plurality of regions, and determining the transformation matrices corresponding to the pixels in the plurality of regions based on determined texture complexities of the pictures to be displayed in the plurality of regions; or determining the texture complexities of the pictures to be displayed in the plurality of regions based on grayscales of pictures to be displayed by center pixels in the plurality of regions and grayscale mean values of pictures to be displayed by pixels in the plurality of regions, and determining the transformation matrices corresponding to the pixels in the plurality of regions based on determined texture complexities of the pictures to be displayed in the plurality of regions.

3. The method according to claim 1, wherein each of the plurality of pixels in the display screen corresponds to one set of transformation matrices, the one set of transformation matrices comprising a plurality of transformation matrices; and each of the plurality of pixels comprises a plurality of light-emitting devices; and the texture complexities are organized into a plurality of classes, and the texture complexities of the plurality of classes are in one-to-one correspondence to the plurality of transformation matrices.

4. The method according to claim 3, wherein at least part of the plurality of pixels in the display screen correspond to different transformation matrices.

5. The method according to claim 3, further comprising:

acquiring actual luminance of the plurality of light-emitting devices in the display screen at a same grayscale;

acquiring target luminance of the plurality of light-emitting devices in one of the pixels in the display screen at different texture complexities; and determining transformation matrices of each of the pixels at different texture complexities based on the actual luminance of the plurality of light-emitting devices in the each of the pixels and the target luminance of the plurality of light-emitting devices in the one of the pixels at different texture complexities.

6. The method according to claim 1, wherein the display screen comprises a plurality of sub-display screens, and the method further comprises:

determining positions of the plurality of pixels in sub-display screens thereof;

determining smoothing coefficients based on the positions of the plurality of pixels in the sub-display screens thereof; and smoothing the transformation matrices based on the smoothing coefficients, and compensating the grayscales of the pixel points based on smoothed transformation matrices.

7. The method according to claim 6, wherein the smoothing coefficients progressively decrease in a direction from a center of the sub-display screen to an end of the sub-display screen.

8. The method according to claim 1, wherein prior to compensating the grayscales of the pixel points in the pictures to be displayed in the plurality of regions based on the transformation matrices, the method further comprises:

mapping the pictures to be displayed in the plurality of regions from high dynamic range images to standard dynamic range images.

9. The method according to claim 8, wherein mapping the pictures to be displayed in the plurality of regions from the high dynamic range images to the standard dynamic range images comprises:

acquiring color look up tables corresponding to the plurality of regions, wherein the color look up tables are related to optical properties of the plurality of regions, and the color look up tables comprise corresponding relationships of original grayscales and mapped grayscales; and mapping the pictures to be displayed in the plurality of regions from the high dynamic range images to the standard dynamic range images based on the color look up tables corresponding to the plurality of regions.

10. A drive board for a display screen, comprising:

a timing controller, configured to determine, based on a source image, compensated grayscales by the method as defined in claim 1, and generate a timing control signal;

a voltage conversion circuit, configured to generate a reference voltage signal and a row drive signal based on a power supply; and a grayscale voltage generation circuit, connected to the voltage conversion circuit, and configured to generate grayscale voltages required by grayscales of pixels of a panel based on the reference voltage signal;

wherein the timing control signal and the row drive signal are supplied to a row drive circuit of the panel, and the compensated grayscales, the timing control signal, and the grayscale voltages required by the grayscales of the pixels of the panel are supplied to a column drive circuit of the panel.

11. A computer device, comprising a processor and a memory; wherein the memory is configured to store computer programs; and the processor, when running the computer programs stored in the memory, is caused to perform a method for compensating a displayed picture in a display screen, wherein the display screen comprises a plurality of regions, each of the plurality of regions comprising a plurality of pixels;

and the method comprises:

determining transformation matrices corresponding to pixels in the plurality of regions based on texture complexities of pictures to be displayed in the plurality of regions;

acquiring compensated grayscales by compensating grayscales of pixel points in the pictures to be displayed in the plurality of regions based on the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

12. The computer device according to claim 11, wherein determining the transformation matrices corresponding to the pixels in the plurality of regions based on the texture complexities of the pictures to be displayed in the plurality of regions comprises:

receiving a texture complexity indication signal indicating the texture complexities of the pictures to be displayed in the plurality of regions, and determining the transformation matrices corresponding to the pixels in the plurality of regions based on the texture complexity indication signal; or performing an edge detection on the pictures to be displayed in the plurality of regions, determining the texture complexities of the pictures to be displayed in the plurality of regions based on a result of the edge detection on the plurality of regions, and determining the transformation matrices corresponding to the pixels in the plurality of regions based on determined texture complexities of the pictures to be displayed in the plurality of regions; or determining the texture complexities of the pictures to be displayed in the plurality of regions based on grayscales of pictures to be displayed by center pixels in the plurality of regions and grayscale mean values of pictures to be displayed by pixels in the plurality of regions, and determining the transformation matrices corresponding to the pixels in the plurality of regions based on determined texture complexities of the pictures to be displayed in the plurality of regions.

13. The computer device according to claim 11, wherein each of the plurality of pixels in the display screen corresponds to one set of transformation matrices, the one set of transformation matrices comprising a plurality of transformation matrices; and each of the plurality of pixels comprises a plurality of light-emitting devices; and the texture complexities are organized into a plurality of classes, and the texture complexities of the plurality of classes are in one-to-one correspondence to the plurality of transformation matrices.

14. The computer device according to claim 13, wherein at least part of the plurality of pixels in the display screen correspond to different transformation matrices.

15. The computer device according to claim 13, further comprising:

acquiring actual luminance of the plurality of light-emitting devices in the display screen at a same grayscale;

acquiring target luminance of the plurality of light-emitting devices in one of the pixels in the display screen at different texture complexities; and determining transformation matrices of each of the pixels at different texture complexities based on the actual luminance of the plurality of light-emitting devices in the each of the pixels and the target luminance of the plurality of light-emitting devices in the one of the pixels at different texture complexities.

16. The computer device according to claim 11, wherein the display screen comprises a plurality of sub-display screens, and the method further comprises:

determining positions of the plurality of pixels in sub-display screens thereof;

determining smoothing coefficients based on the positions of the plurality of pixels in the sub-display screens thereof; and smoothing the transformation matrices based on the smoothing coefficients, and compensating the grayscales of the pixel points based on smoothed transformation matrices.

17. The computer device according to claim 16, wherein the smoothing coefficients progressively decrease in a direction from a center of the sub-display screen to an end of the sub-display screen.

18. The computer device according to claim 11, wherein prior to compensating the grayscales of the pixel points in the pictures to be displayed in the plurality of regions based on the transformation matrices, the method further comprises:

mapping the pictures to be displayed in the plurality of regions from high dynamic range images to standard dynamic range images.

19. The computer device according to claim 18, wherein mapping the pictures to be displayed in the plurality of regions from the high dynamic range images to the standard dynamic range images comprises:

acquiring color look up tables corresponding to the plurality of regions, wherein the color look up tables are related to optical properties of the plurality of regions, and the color look up tables comprise corresponding relationships of original grayscales and mapped grayscales; and mapping the pictures to be displayed in the plurality of regions from the high dynamic range images to the standard dynamic range images based on the color look up tables corresponding to the plurality of regions.

20. A non-transitory computer-readable storage medium storing computer instructions therein, wherein the stored computer instructions, when executed on a processor, causes the processor to perform a method for compensating a displayed picture in a display screen, wherein the display screen comprises a plurality of regions, each of the plurality of regions comprising a plurality of pixels;

and the method comprises:

determining transformation matrices corresponding to pixels in the plurality of regions based on texture complexities of pictures to be displayed in the plurality of regions;

acquiring compensated grayscales by compensating grayscales of pixel points in the pictures to be displayed in the plurality of regions based on the transformation matrices corresponding to the pixels in the plurality of regions, wherein the compensated grayscales are configured to control display of the pictures of the plurality of regions, such that an uniformity of a picture displayed in a first region is greater than an uniformity of a picture displayed in a second region, wherein a texture complexity of the first region is less than a texture complexity of the second region, and each of the first region and the second region is one of the plurality of regions.

* * * * *